United States Patent
Kim et al.

(10) Patent No.: US 9,465,437 B2
(45) Date of Patent: *Oct. 11, 2016

(54) METHOD AND APPARATUS FOR CONTROLLING SCREEN BY TRACKING HEAD OF USER THROUGH CAMERA MODULE, AND COMPUTER-READABLE RECORDING MEDIUM THEREFOR

(71) Applicant: Intel Corporation, Santa Clara, CA (US)

(72) Inventors: Daesung Kim, Gyeonggi-do (KR); Jaihyun Ahn, Seongnam-si (KR)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/998,045

(22) Filed: Dec. 23, 2015

(65) Prior Publication Data

US 2016/0179191 A1    Jun. 23, 2016

Related U.S. Application Data (63) Continuation of application No. 14/129,324, filed as application No. PCT/KR2013/001482 on Feb. 25, 2013, now Pat. No. 9,261,957.

(30) Foreign Application Priority Data

Feb. 23, 2012 (KR) .................. 10-2012-0018737

(51) Int. Cl.
*G06F 3/01* (2006.01)
*G06F 3/0488* (2013.01)
(Continued)

(52) U.S. Cl.
CPC ............ *G06F 3/012* (2013.01); *G06F 3/0485* (2013.01); *G06F 3/04845* (2013.01); *G06F 3/04886* (2013.01)

(58) Field of Classification Search
CPC .. G06F 3/012; G06F 3/0485; G06F 3/04845; G06F 3/04886

USPC ......................................................... 345/156
See application file for complete search history.

(56) References Cited

U.S. PATENT DOCUMENTS

| 5,859,642 A * | 1/1999 | Jones ..................... G06F 3/011 345/156 |
| 7,965,298 B2 * | 6/2011 | Lea ....................... G06F 1/1613 345/428 |

(Continued)

FOREIGN PATENT DOCUMENTS

| JP | 1994187092 | 2/1996 |
| JP | 1999008822 | 7/2000 |

(Continued)

OTHER PUBLICATIONS

JP Application No. 2014-558687, Decision to Refuse, Apr. 7, 2016, 7 pages.

(Continued)

*Primary Examiner* — Andrew Sasinowski
*Assistant Examiner* — Chineyere Wills-Burns
(74) *Attorney, Agent, or Firm* — Blakely, Sokoloff, Taylor & Zafman LLP (57) ABSTRACT

Controlling a screen by tracking user's head using a camera module is described, comprising: (a) when a request for displaying contents is received, displaying a plurality of content regions on a screen and tracking the head of the user looking at the screen through the camera module; and (b) when it is determined in the tracking that the head of the user moves in a specific direction in a state where information on a first content is displayed in a central content region among the plurality of content regions, displaying, in the central content region, information on a second content which was displayed in a peripheral content region, the peripheral content region being positioned in the specific direction or in a direction opposite to the specific direction from the central content region.

20 Claims, 9 Drawing Sheets

(51) Int. Cl.
*G06F 3/0485* (2013.01)
*G06F 3/0484* (2013.01)

(56) References Cited

U.S. PATENT DOCUMENTS

| | | | |
|---|---|---|---|
| 8,064,647 B2 * | 11/2011 | Bazakos | G06K 9/00261 |
| | | | 382/117 |
| 8,069,420 B2 * | 11/2011 | Plummer | G06F 19/321 |
| | | | 600/921 |
| 2006/0271867 A1 * | 11/2006 | Wang | G06F 3/0482 |
| | | | 715/764 |
| 2009/0228841 A1 | 9/2009 | Hildreth | |
| 2009/0313584 A1 * | 12/2009 | Kerr | G06F 3/012 |
| | | | 715/849 |
| 2010/0125816 A1 | 5/2010 | Bezos | |
| 2012/0146891 A1 * | 6/2012 | Kalinli | H04N 19/33 |
| | | | 345/156 |
| 2012/0256967 A1 * | 10/2012 | Baldwin | G06F 3/013 |
| | | | 345/684 |

FOREIGN PATENT DOCUMENTS

| | | |
|---|---|---|
| JP | 2002116859 | 4/2002 |
| JP | 2005056059 | 9/2006 |
| JP | 2005121768 | 11/2006 |
| JP | 2009031368 | 8/2010 |
| JP | 2010262525 | 4/2011 |
| JP | 2011209786 | 10/2011 |
| JP | 2011015301 | 8/2012 |
| WO | WO2009111329 | 9/2009 |

OTHER PUBLICATIONS

CN Application No. 201380011790.7, First Office Action, Jun. 12, 2016, 11 pages.

* cited by examiner

METHOD AND APPARATUS FOR CONTROLLING SCREEN BY TRACKING HEAD OF USER THROUGH CAMERA MODULE, AND COMPUTER-READABLE RECORDING MEDIUM THEREFOR

The present patent application is continuation application claiming priority from application Ser. No. 14/129,324, which is a U.S. National Phase Application under 35 U.S.C. 371 of International Application No. PCT/KR2013/001482 filed Feb. 25, 2013, which claims priority from Korean Application No. 10-2012-0018737, filed Feb. 23, 2012, the contents of which are incorporated herein in their entirety by reference.

TECHNICAL FIELD

The present disclosure relates to a method, apparatus, and a computer-readable recording medium for controlling a screen by tracking a user's head through a camera module. More particularly, the present disclosure relates to a method, apparatus, and a computer-readable recording medium for tracking movement of the head of a user through a camera module and moving a screen according to the movement of the user's head so that information on a content, which the user wishes to select from the screen, is displayed in a central content region.

BACKGROUND ART

In a conventional screen controlling apparatus, such as a mobile communication terminal, a portable media player (PMP), a television (TV), or a personal computer (PC), an input device, such as a mechanical key button, a button type remote controller, or a mouse, has been used by a user to control a display screen. Recently, due to the development of a touch sensing technology, almost all of the functions of an image output device may be controlled, without using the conventional input devices, through the user's finger contact with a display panel so that the image output device, such as a smart phone, a tablet PC, or a smart TV, may perform more convenient and more various functions than a conventional terminal.

However, in a pressure sensitive touch sensing technology or a resistive touch sensing technology, touch sensitivity is low. In a capacitive touch sensing technology, it is difficult to control the image output device when the user wears a glove having different capacitance from that of the finger or when the finger is covered with water or a foreign substance. In addition, although touch sensing may be used, repetitive finger contacts with the screen make the user tired and inconvenient. Therefore, a more convenient and simpler input unit for the user is necessary.

DISCLOSURE OF INVENTION

Technical Problem

An object of the present disclosure is to provide a method of tracking the head of a user through a camera module and controlling a displayed screen according to the movement of the head of the user to allow the user to search for and select a desired content from a plurality of contents without using any additional input unit.

Further, another object of the present disclosure is to implement a user convenient interface by allowing various contents to respectively correspond each of three-dimensional grids and by allowing detailed information on a specific content positioned in a central content region to be easily read.

Solution to Problem

The representative configuration of the various embodiments of the present disclosure for achieving the aforementioned objects is described below.

According to some aspects of the present disclosure, there is provided a method of controlling a screen by tracking a user's head through a camera module, comprising: (a) when a request for displaying contents is received, displaying a plurality of content regions on a screen and tracking the head of the user looking at the screen through the camera module; and (b) when it is determined in the tracking that the head of the user moves in a specific direction in a state where information on a first content is displayed in a central content region among the plurality of content regions, displaying, in the central content region, information on a second content which was displayed in a peripheral content region, the peripheral content region being positioned in the specific direction or in a direction opposite to the specific direction from the central content region.

According to another aspect of the present disclosure, there is provided an apparatus for controlling a screen by tracking a head of a user through a camera module, comprising: a head tracking unit for tracking the head of the user looking at the screen through the camera module; and a screen control unit for displaying a plurality of content regions on a screen when a display request of a content is received, and when it is determined in the tracking that the head of the user moves in a specific direction in a state where information on a first content is displayed in a central content region among the plurality of content regions, displaying, in the central content region, information on a second content which was displayed in a peripheral content region, the peripheral content region being positioned in the specific direction or in a direction opposite to the specific direction from the central content region.

Advantageous Effects of Invention

According to various embodiments, the present disclosure provides an intuitive and convenient user interface allowing a user to easily access a specific content corresponding to each grid through simple head movement, while various contents are mapped to corresponding three-dimensional grids.

In addition, according to some embodiments of the present disclosure, a user can perform various kinds of instructions/operations for a desired content, including but not limited to selecting, enlarging, reducing, reproducing, and scrolling, through simple head movement.

BEST MODE FOR CARRYING OUT THE INVENTION

In the following detailed description of the present disclosure, reference is made to the accompanying drawings that show, by way of illustration, specific embodiments in which various embodiments of the present disclosure may be practiced. These embodiments are described in sufficient detail to enable those skilled in the art to practice the present disclosure. It is to be understood that the various embodiments of the present disclosure, although different from one another, are not necessarily mutually exclusive. For example, a particular feature, structure, and characteristic described herein in connection with one embodiment may be implemented within other embodiments without departing from the spirit and scope of the present disclosure. Also, it is to be understood that the positions or arrangements of individual elements in the embodiment may be changed without separating the spirit and scope of the present disclosure. The following detailed description is, therefore, not to be taken in a limiting sense, and the scope of the present disclosure is defined only by the appended claims along with the full range of equivalents to which the claims are entitled, where appropriate.

Preferred Embodiments of the Present Disclosure

Figure 1:
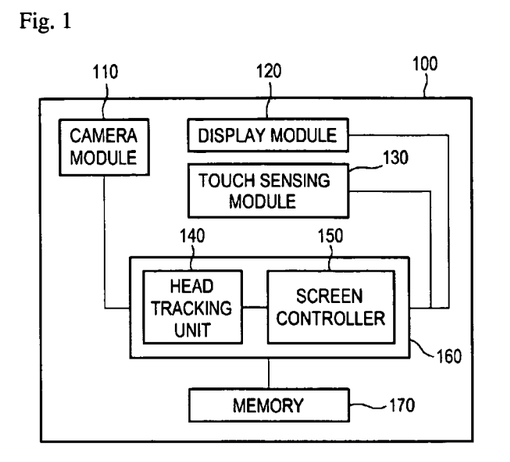
FIG. 1 is a view exemplarily illustrating the configuration of a screen controlling apparatus according to some embodiments.

FIG. 1 is a view exemplarily illustrating the configuration of a screen controlling apparatus according to embodiments.

Referring to FIG. 1, the screen controlling apparatus may include a camera module 110, a display module 120, a touch sensing module 130, an operation processing module 160 (including a head tracking unit 140 and a screen control unit 150), and a memory 170.

The camera module 110 may include a lens unit, an image sensor unit, a lighting unit, and the like (not shown) in order to photograph an object and may transfer image sensor information obtained by photographing a user to the operation processing module 160.

The display module 120 receives a display signal from the operation processing module 160 to output a screen. The touch sensing module 130 may configured to be any one of a resistive touch sensing module, a pressure sensitive touch sensing module, and a capacitive touch sensing module. The touch sensing module 130 may be combined with the display module 120 and may be exposed separately from the display module 120. The touch sensing module 130 may generate an input signal based on a user contact to transmit it to the operation processing module 160 so that the operation processing module 160 is allowed to control the screen to be output through the display module.

The operation processing module 160 includes the head tracking unit 140 and the screen control unit 150. The head tracking unit 140 and the screen control unit 150 are functionally distinguished parts in the operation processing module 160 both of which operate through application program modules. At least a part of the application program modules may have a form of an operation system, an application program module, and other program modules and may be physically stored in the memory 170 included in the screen controlling apparatus 100 or stored in various well-known storage devices communicatively connected to the screen controlling apparatus 100 in a wired or wireless manner. The application program modules may include a routine, a subroutine, a program, an object, a component, a data structure, and the like that perform specific works to be described below or that execute specific abstract data types, but they are not limited to the above.

The head tracking unit 140 recognizes the head of a user or the face that is a part of the head in an image photographed by the camera module 110. When the head of the user or the face that is a part of the head is recognized, the size, the position, or the angle of the head of the user in the image is calculated in real time. For example, the head of the user is continuously tracked in the images of 50 frames per second with determining whether there is a change in the size, the position, or the angle of the head of the user. The head tracking unit 140 determines that a predetermined input is performed through the head of the user if there is a change in the size, the position, or the angle of the head of the user. In order to remove noises, it may be determined that the user performs a predetermined input only when the change in the size, the position, or the angle of the head of the user is continuously kept for a predetermined number of frames, for example, in no less than 10 frames, from the frame in which the change in the size, the position, or the angle of the head of the user is generated. Here, the rotation angle of the head, or the like may be obtained by observing a change in feature points of the face.

However, the head tracking unit 140 is not limited to track the head of the user through the change in the size, the position, or the angle of the head of the user as described above, but may track the head of the user by sensing other changes that may be generated in photographed images according to the movement of the face, such as color changes in the hair and the face of the user or changes in the shapes of the face and the neck.

The screen control unit 150 may control the display module 120 to display a plurality of content regions when receiving a display request of content from the user. The display request of the content may be received through the touch sensing module 130, and may be input through an additional mechanical key button or mike not shown.

The screen control unit 150 may display an image photographed by the camera module as well as the plurality of content regions to overlap a part of the plurality of content regions or in an additional region of the screen. In addition, the screen control unit 150 may highlight a central content region so that the central content region is distinguishable from other peripheral content regions. For example, the screen control unit 150 may additionally display a dotted line or a color line like a viewfinder of a camera in the fixed central content region.

The screen control unit 150 controls the display module 120 to display, in the central content region, information on a second content which was displayed in a peripheral region displayed by making the plurality of content regions slide when the head tracking unit 140 determines that the head of the user moves upwardly, downwardly or sidewardly in a state where information on a first content is displayed in the central content region. For example, when the head of the user moves leftwardly, the plurality of content regions slide to the left so that information on content which was displayed in a right peripheral content region of the central content region may be displayed in the central content region.

Further, the screen control unit 150 may control the screen output from the display module 120 based on a combination of whether an additional touch input is received from the touch sensing module 130 with a head tracking result. For example, a screen control button may be displayed in a specific region of the screen in a state where the plurality of content regions are displayed. When the screen control button is selected by the user, the screen control unit 150 may allow the plurality of content regions to slide only when there is both the movement of the head of the user and a touch input received through the touch sensing module 130.

In addition, if the screen control button is selected by continuously pressing the button for a predetermined time t1, for example, three seconds, the screen control unit 150 may control the display module 120 to prevent the plurality of content regions sliding even though the head tracking unit 140 detects the movement of the head of the user. After then, if the screen control button is selected again by continuously pressing the button for a predetermined time t2, for example, three seconds, the screen control unit 150 may allow again the plurality of content regions to slide so that information on content displayed in the central content region, for example, a thumbnail image is changed according to the movement of the head.

If the information on the specific content is continuously displayed in the central content region for a predetermined time t3, for example, two seconds, the screen control unit 150 may control the display module 120 to move to a detailed screen for the specific content. Even in the detailed screen state, the screen control unit may control the detailed screen to be scrolled, enlarged, or reduced, or to return to the screen of the plurality of content regions, if the head tracking unit determines that there is a movement of the head of the user.

The screen displayed as a result of the control as described above will be described in detail later with reference to FIGS. 3 and 6 to 10.

Figure 2:
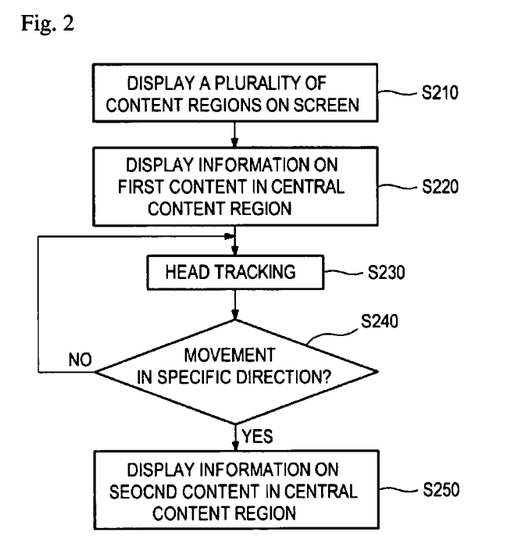
FIG. 2 is a flowchart illustrating a process of performing a screen controlling method according to some embodiments.

FIG. 2 is a flowchart illustrating a process of performing a screen controlling method according to some embodiments.

Referring to FIG. 2, the screen controlling apparatus 100 receives a display request of content from a user and displays a plurality of content regions on a screen (S210). The plurality of content regions are grid-shaped regions including screen units obtained by dividing the screen region in advance each of which can display information on respective content. For example, information on images, photos, and moving images may be displayed in the plurality of content regions, respectively, so that contents such as a photo and a moving image photographed by a camera module, an image and a moving image that are downloaded, and an image and a moving image created by the user may be easily searched for by the user. Thumbnail images obtained by encoding images or moving images to images of low resolution may be arranged in the plurality of content regions so that the user may confirm which contents exist at a look. However, the maximum number of thumbnail images that may be generally displayed on the screen does not exceed a total of 20, for example, in the case of a grid array of five by four, while the number of contents stored in the memory 170 of the screen controlling apparatus 100 is larger than 20. Therefore, in order for the user to search for all of the plurality of stored contents, it is necessary for the screen showing the plurality of content regions to be moved in a direction desired by the user.

According to some embodiments of the present disclosure, the screen controlling apparatus 100 may display information on a first content in a central content region among the plurality of content regions (S220). The central content region as one of the plurality of content regions may be positioned, for example, in the center of a screen, and may be highlighted. For example, the frame of the central content region may be displayed by a color line or a dot line, the brightness of the inside of the central content region is controlled, or a flickering effect is given so that the central content region may be distinguished from peripheral content regions. However, the present disclosure is not limited to the above.

In this state, according to the present disclosure, the screen controlling apparatus 100 tracks the head of the user photographed by the camera module 110 (S230). Head tracking, which tracks the movement of the head of the user, may be implemented by various methods as described above with reference to FIG. 1. According to the present disclosure, the movement of the head of the user includes the movement of the face that is a part of the head of the user as described above with reference to FIG. 1.

According to some embodiments of the present disclosure, when the screen controlling apparatus 100 determines that the head of the user moves in a specific direction (S240), information on a second content which was displayed in the peripheral content region of the central content region is displayed in the central content region, instead of the information on the first content displayed in the central content region in S220 (S250).

For example, when it is determined that the user moves his or her head leftwardly by tilting the head to the left or by rotating the head to the left in a state where information items on three contents from side to side (sequentially, a thumbnail image 1, a thumbnail image 2, and a thumbnail image 3) are displayed in a left peripheral content region, the central content region, and a right peripheral content region, respectively, the entire screen may slide to the left, for example, so that the thumbnail image 3 is displayed in the central content region. The central content region may be fixed to the center of the screen to be displayed.

Figure 3:
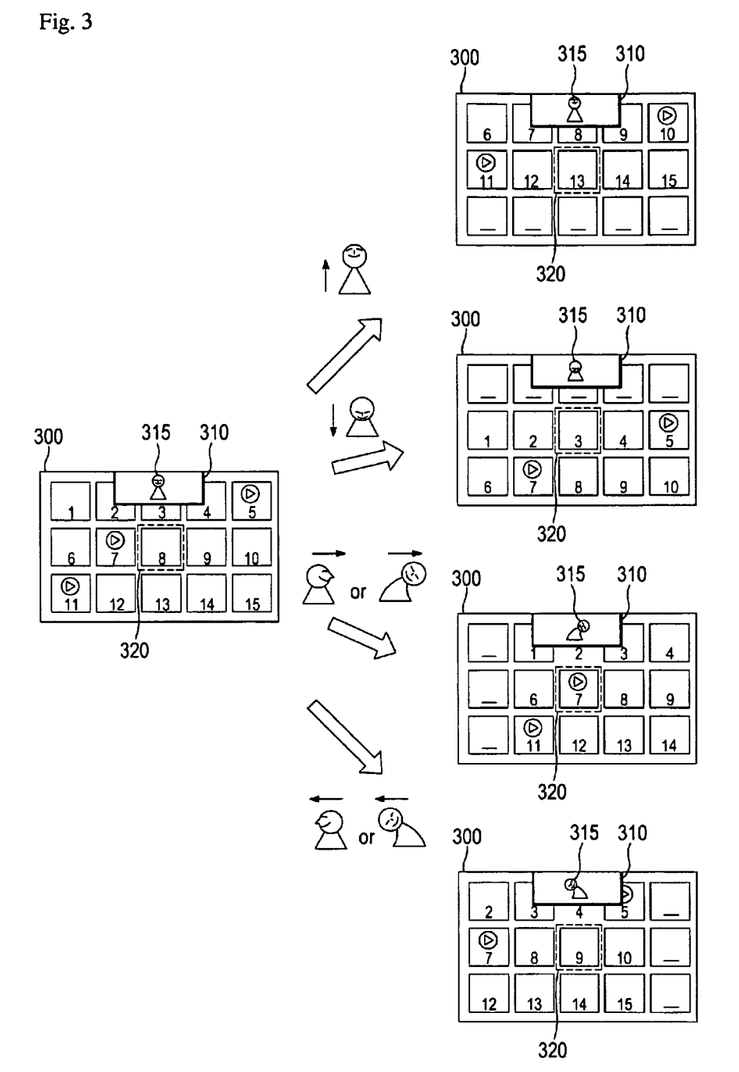
FIG. 3 is an exemplary view illustrating screens at each stage when a screen controlling method according to some embodiments is applied.

FIG. 3 is an exemplary view illustrating screens at each stage when a screen controlling method according to embodiments is applied.

A total of 15 content regions in a grid array of five by three are displayed on a screen 300 of the screen controlling apparatus 100 illustrated on the left of FIG. 3. In FIG. 3, for the convenience of explanation, the plurality of content regions are arranged in the form of a grid. However, the plurality of content regions may be set to be shown to the user as being arranged inside or outside a three-dimensional sphere or cubic and may be set to be shown in the form of a two-dimensional list.

Information items on the respective contents are displayed in the plurality of content regions. The information items on the contents may be displayed in various forms such as thumbnail images, icons, metadata, text description, and tag information, but are not limited to the specific data forms and contents. In addition, the contents may be in the form of audio files, document files, and the like as well as images or moving images. In this case, the information items on the contents may be displayed as texts that represent the titles, creators, or the like of documents or audios other than the thumbnail images, or may be displayed in the form of images such as icons. In particular, the documents may be files having extensions such as doc, docx, hwp, ppt, pptx, xls, xlsx, pps, ppsx, pdf, and gul. In this case, the icons and the document titles distinguished by the extensions may be simultaneously displayed as the information items on the contents. However, the kinds of the documents or the kinds and forms of the information items on the contents are not limited to the above.

Hereinafter, for the convenience of explanation, it is assumed that the plurality of thumbnail images of the images or the moving image contents are displayed on the screen 300 in the plurality of content regions, respectively.

In the central upper end of the screen 300, an image 310 obtained by photographing the user by the camera module 110 is displayed in an upper layer overlapping some of the plurality of content regions. However, the position of the image 310 obtained by photographing the user is not limited to the central upper end. The image 310 may be displayed in a separately assigned region from the plurality of content regions, instead of being layered with the plurality of content regions.

The image 310 obtained by photographing the user may be distinguished from the plurality of content regions by an additional outline, or the like. When the head or the face 315 of the user is recognized in the image, a display line for representing three-dimensionally the silhouette of the head or the eyes, the nose, the lip, and the like of the face may be also displayed. The display line may be fixed or may change to reflect the tracking of the movement of the head in real time. When the display line is fixed, the user may look at the image to confirm a degree to which the head moves in the image. Meanwhile, when the display line is set to move with the head 315 in the image 310 obtained by photographing the user, the user may confirm that the head tracking is normally performed.

In addition, for example, the outline of the image 310 obtained by photographing the user may be displayed to be green when the head tracking is normally performed, while it may be displayed to be red when the head or the face cannot be appropriately recognized due to a poor lighting condition such as backlight or the like or a large amount of noise information so that the user may confirm the state of the head tracking. Whether the head tracking is normally performed may be presented by a text message such as "tracking normal" or "tracking fail" or may be provided to the user through an audio output such as a beeper sound, other than the above-described method. Such a feedback guides the user to correct a pose to achieve a lighting condition, a face size condition, and a face angle condition in which the head or the face included in the head may be recognized, and allows the user to learn an environment, a pose, and a movement appropriate to the head tracking.

When the user moves the head upwardly by tilting the head back or by erecting the neck in a state where a thumbnail image 8 is first displayed in a central content region 320, the screen controlling apparatus 100 determines that the head of the user moves upward and slides the entire plurality of content regions upwardly to allow a thumbnail image 13 which was displayed in a peripheral content region positioned in the lower side of the central content region 320 to be displayed in the central content region 320. Therefore, the user may position a desired thumbnail image in the central content region 320 only by the movement of the head without using a conventional input unit. In this case, the arrangement of the information items on the plurality of contents displayed in the plurality of content regions may be maintained. For example, the entire screen may slide while the arrangement of the thumbnail image 1, the thumbnail image 2, ?, and the thumbnail image 15 is maintained.

When the user moves the head downwardly, according to the similar process as described above, the entire plurality of content regions slide and the thumbnail image 3 which was displayed in a peripheral content region positioned in the upper side of the central content image is displayed in the central content region 320.

Similarly, when the user rotates the head sidewardly or tilts the neck to a shoulder from side to side so that the position of the head itself is changed, the screen controlling apparatus 100 determines that the head of the user moves from side to side and slide the entire plurality of content regions so that the thumbnail image 7 or the thumbnail image 9 is displayed in the central content region.

In FIG. 3, the process in which the entire plurality of content regions slide in the same direction as the movement direction of the head of the user is illustrated. However, the slide direction of the plurality of content regions is not limited to the above but the entire plurality of content regions may slide in an opposite direction to the movement direction of the head of the user. For example, when the central content region 320 is highlighted by an additional dot line, color line, or the like which may be recognized as a three-dimensionally or hierarchically floating entity like a viewfinder of a camera, the user may believe intuitively that he or she must move his or her head to the left in order to select the peripheral content region on the left of the central content region. In this case, the screen may be set to slide in the opposite direction to the movement direction of the head. The screen controlling apparatus 100 may provide a separate menu for the user to select whether the slide direction of the screen is set to be the same as or to be opposite to the movement direction of the head, as desired by the user.

In the above, a description is made assuming that the plurality of content regions are arranged in the form of a grid. However, even when the plurality of content regions are set to be arranged as being inside or outside a polyhedron such as a three-dimensional sphere or a cube, the plurality of content regions may rotate according to the movement of the head of the user in a state where the weight center of the sphere or the cubic is fixed.

Figure 4:
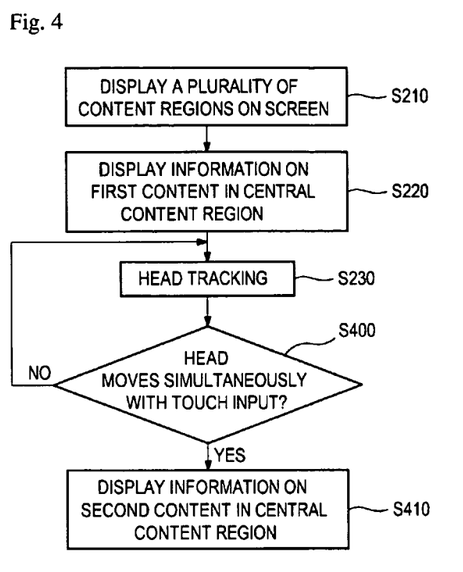
FIG. 4 is a flowchart illustrating a process of performing a screen controlling method according to some embodiments.

FIG. 4 is a flowchart illustrating a process of performing a screen controlling method according to some embodiments.

The user may not intend to perform the screen controlling method according to the present disclosure whenever he or she moves the head. In particular, if the user searches for information on contents for a long time or if the screen controlling method according to the present disclosure is performed in a shaking subway or vehicle, an unintended movement of the head may be generated. In this case, even though the user does not desire, a screen slides to change information on content displayed in a central content region.

Referring to FIG. 4, as described in FIG. 2, the head of the user is tracked in a state where steps S210 and S220 are performed (S230).

Then, only when it is determined that the head of the user moves in a state where a touch input exists (S400), information on a second content is displayed in the central content region (S410). In this case, the screen controlling apparatus 100 may additionally display a screen control button on the left and right or in the lower end of the screen so that the user may select the screen control button by touching it.

According to some embodiments, since step S410 is performed only when the user touches the screen control button and moves his or her head, it is possible to prevent the screen from sliding due to the unintended movement of the head of the user.

In the above, the touch input is assumed in the above description. However, the present disclosure is not limited to the above but it may be configured to perform step S410 when the movement of the head of the user is determined and there is an input through an additional mechanical key button included in the screen controlling apparatus 100 or by a sound input such as "up", "down", "left", and "right".

A screen displayed by applying the screen controlling method illustrated in FIG. 4 will be described in detail later with reference to FIG. 6.

Figure 5:
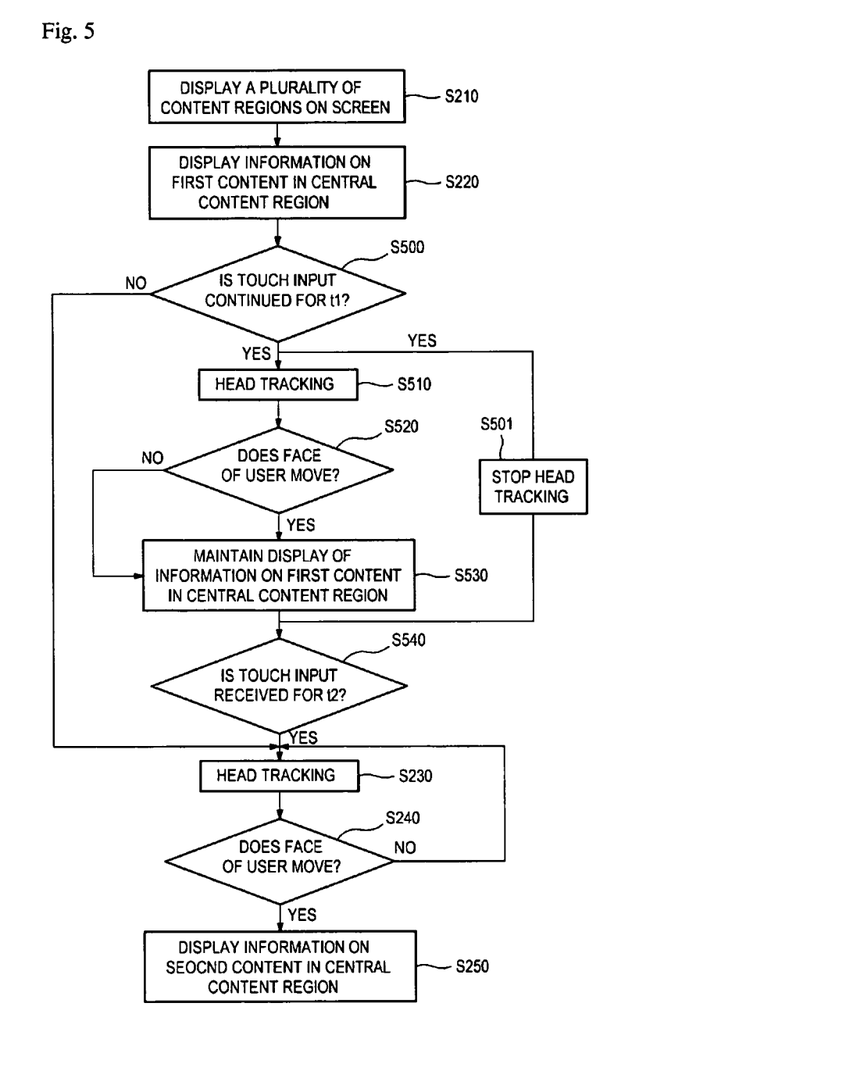
FIG. 5 is a flowchart illustrating a process of performing a screen controlling method according to some embodiments.

FIG. 5 is a flowchart illustrating a process of performing a screen controlling method according to some embodiments.

Referring to FIG. 5, the screen controlling apparatus 100 may perform steps S210 and S220 as described in FIG. 2. Then, if the screen controlling apparatus 100 continuously receives a touch input for a predetermined time t1 (S500), even when it is determined in the tracking that there is a movement of the head of the user or the face that is a part of the head (S520), unlike in FIG. 1, information on a first content that was displayed in a central content region in step S220 is maintained in the central content region (S530). For example, if the user selects a screen control button displayed in a part of a screen by continuously pressing it for three seconds, the plurality of content regions do not slide or rotate so that the information on the first content is displayed in the central content region.

According to another embodiment of the present disclosure, steps S510, S520, and S530 as described above may be replaced by step S501 of stopping head tracking itself. That is, when the head tracking is stopped, since the plurality of content regions may not slide, the state in which the information on the first content is displayed in the central content region is of course maintained.

Although not shown, before performing the above steps S510 and S501, the screen controlling apparatus 100 may further perform step of displaying, in a region of the screen, a message or a mark representing that the screen will not be changed although the user moves his or her head. That is, a text message such as "Lock" or any other mark may be displayed. In addition, a beeper sound meaning that the screen is not changed may be audio output to inform the user of it.

After then, if an input of continuously contacting the text message or other mark described above for a predetermined time t2, for example, three seconds is received, the image outputting device performs the head tracking and if the movement of the face of the user is detected, performs the step of displaying information on a second content in the central content region. That is, a slide function of the screen according to the movement of the face is unlocked. Here, t1 and t2 are not necessarily set to be the same but may be set to vary such that t1 is three seconds and t2 is four seconds.

The screen displayed by applying the screen controlling method illustrated in FIG. 5 will be described in detail below with reference to FIG. 6.

Figure 6:
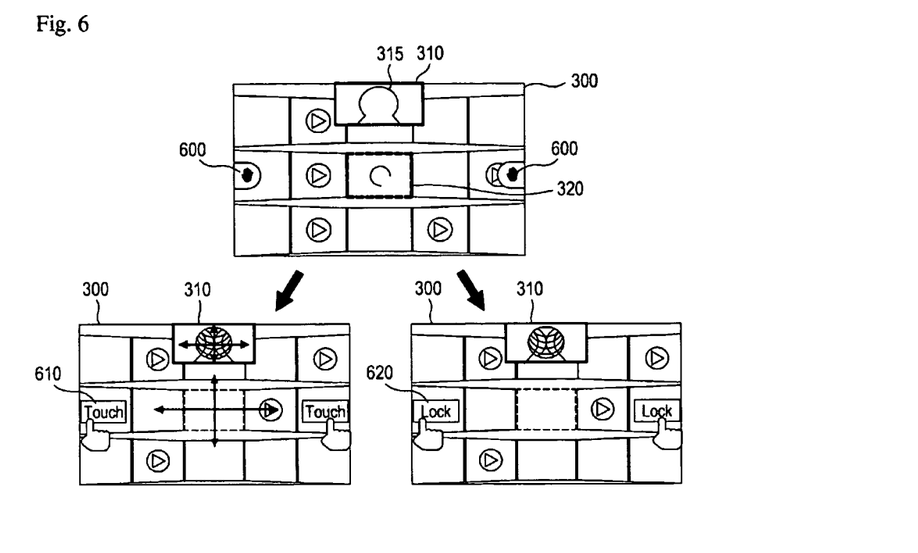
FIG. 6 is an exemplary view illustrating displayed screens at each stage when a screen controlling method according to some embodiments is applied.

FIG. 6 is an exemplary view illustrating displayed screens at each stage when a screen controlling method according to some embodiments is applied.

Referring to FIG. 6, a plurality of content regions are displayed on the screen 300. On the screen 300, the screen 310 obtained by photographing the face of the user through a camera module is displayed. Information on a specific content is also displayed in the central content region 320. In addition, screen control buttons 600, which are soft buttons including hand shapes illustrated therein, may be displayed on the left and right of the screen 300. As illustrated in FIG. 4, if the screen controlling apparatus 100 is set to control the screen to reflect the movement of the head of the user only when an additional touch input exists, the additional touch input may be received through the screen control buttons 600 illustrated in FIG. 6. However, the position, the size, the shape, and the color of the illustrated screen control buttons 600 are merely exemplary and the screen control buttons 600 may be displayed in various positions with various shapes.

As illustrated in FIG. 4, although the head of the user moves upwardly, downwardly, or sidewardly, the plurality of content regions do not slide up and down and side to side unless the screen control buttons are selected through the user's finger contact thereto, information on a content displayed in the central content region is not changed.

On the other hand, if the user moves his or her head while the user contacts the screen control buttons by a finger or the like, the entire plurality of content regions may slide in the movement direction of the head so that the information on the content displayed in the central content region is changed. In this case, marks 610 representing that the screen control buttons are touched may be displayed so that the user may recognize that the screen control buttons are selected. In FIG. 6, the screen control buttons are displayed by the marks 610 each including a text "Touch", but they may be replaced by various figures or the like that mean that the screen control buttons are touched.

Meanwhile, if the user continuously touches the screen control button for a predetermined time t1, for example, three seconds, as illustrated in FIG. 5, even though it is determined that the head of the user moves, the plurality of content regions do not slide and the information on the content displayed in the central content region is not changed. In this case, marks 620 representing that screen control is not performed may be displayed. In FIG. 6, the screen control buttons are displayed by the marks 620 each including a text "Lock", but they may be replaced by various figures or the like. Such a state is maintained until the marks 620 each including the text "Lock" are pressed again for a predetermined time t2, for example, three seconds. However, t1 and t2 are not necessarily the same but may vary such that t1 is four seconds and t2 is three seconds.

More specifically, for example, although the user moves his or her head while touching the mark 620 including the text "Lock," the screen does not slide. However, when the time for which the user touches the mark 620 including the text "Lock" is larger than t2, for example, three seconds, the screen control buttons 600 are displayed again. Therefore, when the screen controlling apparatus 100 detects the movement of the head of the user in the state where the screen control buttons 600 are selected, the plurality of content regions may slide so that information on content displayed in a peripheral content region may be displayed in the central content region.

Figure 7:
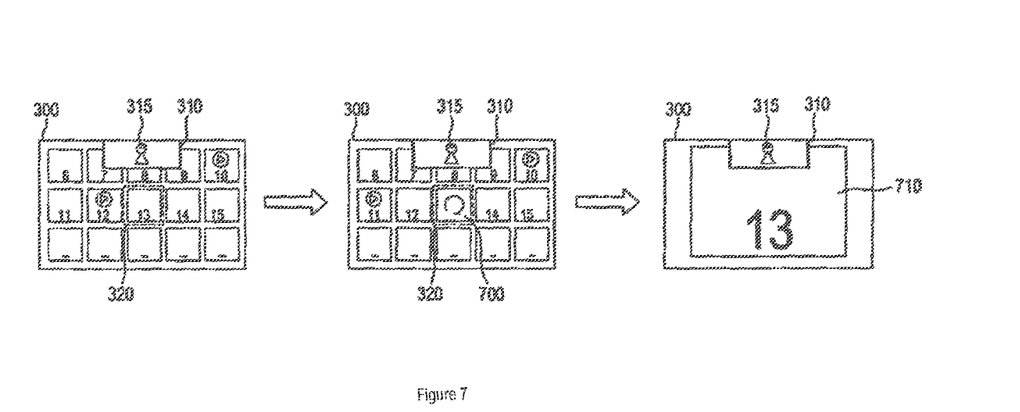
FIG. 7 is an exemplary view illustrating a sequential movement to a detailed screen when a screen controlling method according to some embodiments is applied.

FIG. 7 is an exemplary view illustrating a sequential movement to a detailed screen when a screen controlling method according to some embodiments is applied.

Referring to FIG. 7, when, for a predetermined time t3, for example, two seconds, the thumbnail image 13 of information on a specific content is continuously displayed in the central content region 320 with no movement of the head of the user, the screen controlling apparatus 100 makes a movement to a detailed screen in which the original photo or picture image corresponding to the thumbnail image 13 is displayed in detail.

In this case, it instead of the thumbnail image 13, a loading image 700 may be displayed in the central content region 320, which represents that the screen controlling apparatus 100 is loading the corresponding image to entirely display it. The loading image 700 may be displayed in the form of a circular arrow or a bar.

In the above, a description is made assuming that the specific content is a still image such as an image or a photo and that the information on the specific content is displayed by the thumbnail image. However, this is only an example and the specific content may include a moving image, a document, an audio file, and the like, and the information on the specific content may also be displayed in the form of an icon, a figure, a text, or the like as well as the thumbnail image, as described above.

Figure 8:
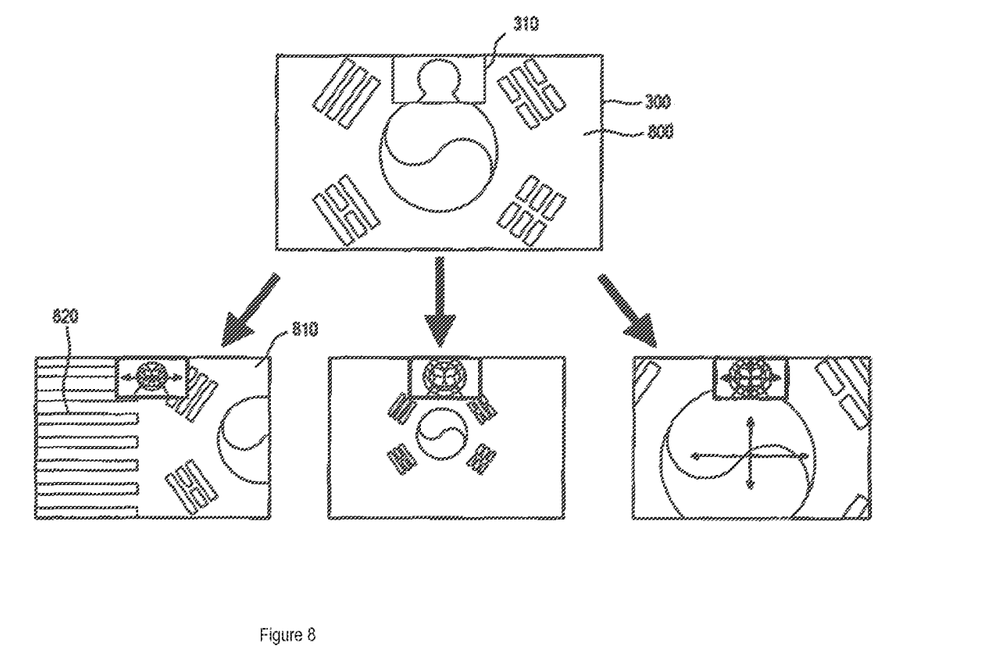
FIG. 8 is a view illustrating a process of controlling a detailed screen when a screen controlling method according to some embodiments is applied.

FIG. 8 is a view illustrating a process of controlling a detailed screen when a screen controlling method according to embodiments is applied.

Referring to FIG. 8, it is assumed that a movement has been made to the detailed screen illustrated in FIG. 7. For the convenience of description, a description will be made with respect to a case in which a specific content as the Korean flag image is displayed in the detailed screen.

The image 310 obtained by photographing the user through the camera module 110 is output to the center of the upper end of the detailed screen. Therefore, the user may directly know that his or her head is moved or tracked.

In the detailed screen, image indicators 800 representing whether a previous or next content exists are displayed on the left and right of the detailed screen. The "previous or next" is based on an arrangement order of the plurality of content regions displayed before moving to the detailed screen. For example, in FIG. 6, it may be assumed that a thumbnail image (the thumbnail image 12) for the American flag is output in the left peripheral content region of the central content region 320, that a thumbnail image (the thumbnail image 13) for the Korean flag is output in the central content region, and that a thumbnail image (the thumbnail image 14) for the Japanese flag is output in the right peripheral content region of the central content region. In this case, the "previous" content may be the American flag image and the "next" content may be the Japanese flag image.

The user may determine whether the previous image or the next image exists through the image indicators 800 without returning to a state in which the plurality of content regions are displayed.

In the above state, when it is determined that the user moves his or her head to the right, the screen controlling apparatus 100 may slide the detailed screen to the right. Therefore, to the user, the Korean flag image 810 may be shown as disleappearing to the right and the American flag image 820 that is a previous image, may be shown as appearing from the left. Therefore, according to some embodiments of the present disclosure, the screen may be controlled for the user to see the previous content or the next content in the detailed screen state through the movement of the head without returning the display of the plurality of content regions again.

It may be assumed that the user moves his or her head backward in the detailed screen state so that the head of the user is remote from the camera module 110 or that the camera module is remote from the user. In this case, since the size of the head of the user or the face that is a part of the head of the user is reduced in the image 310 photographed by the camera module 110, the screen controlling apparatus 100 may determine that the head of the user is moved to be remote from the camera module 100. In this case, the image on the detailed screen, that is, the Korean flag image is reduced to be displayed.

In addition, when the user moves his or her head to be close to the camera module or moves the camera module 110 to the face of the user in the detailed screen state, since the size of the head of the user or the face that is a part of the head of the user is increased in the image photographed, the screen controlling apparatus 100 may determine that the head of the user is moved to be close to the camera module. In this case, the image on the detailed screen, that is, the Korean flag image is enlarged to be displayed. Therefore, as illustrated in FIG. 8, only the taegeuk pattern in the Korean flag image is enlarged to be displayed.

In addition, when the screen controlling apparatus 100 determines the up and down and side to side movements of the head of the user in a state where the detailed screen is enlarged, the detailed screen may be scrolled while maintaining the state in which the Korean flag image is enlarged. Therefore, the detailed screen, which shows the enlarged taegeuk pattern, may be scrolled so that the four trigrams of the Korean falg, i.e., geon, gon, gam, and ri, may be shown as being enlarged, according to the up and down and side to side movements of the user's head.

Figure 9:
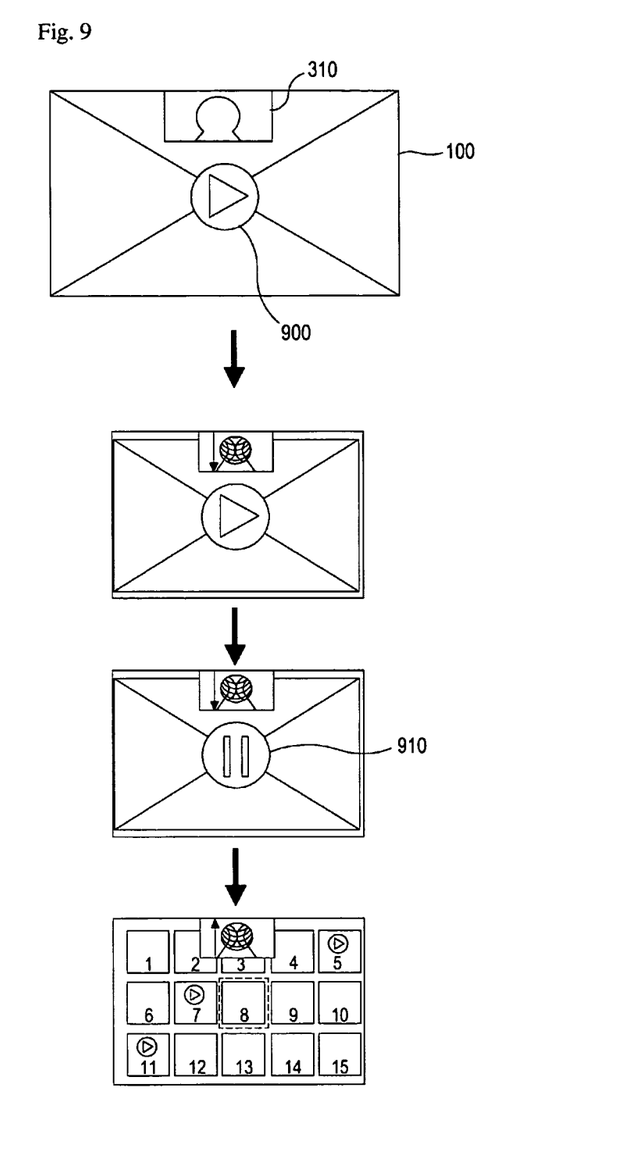
FIG. 9 is a view illustrating a process of controlling a detailed screen when a screen controlling method according to some embodiments is applied.

FIG. 9 is a view illustrating a process of controlling a detailed screen when a screen controlling method according to embodiments is applied.

FIG. 9 illustrates a state of the detailed screen as described in FIG. 7, in which a specific content is a moving image, not an image or a photo like in FIG. 8.

Referring to FIG. 9, the detailed screen for the moving image may first display a first frame of the moving image or a screen on which a FIG. 900 representing the moving image in the center with a dark colored screen.

In this case, when the user tilts his or her head downwardly, the screen controlling apparatus 100 may determine that the head of the user moves downward and may reproduce the moving image. When the user nods his or her head downwardly while the moving image is reproduced, the screen controlling apparatus 100 may determine that the head of the user moves downwardly and may stop the reproduction and display of the moving image. Then, the frame screen of the moving image at the time when the reproduction of the moving image is stopped may be displayed as a still image. In this case, a predetermined figure representing that the reproduction of the moving image is stopped may also be displayed in the center of the stopped frame screen.

When the user moves his or her head upwardly on the detailed screen in a state where the moving image is stopped, it is determined that the head of the user is moved upwardly so that a movement may be made to the screen on which the plurality of content regions are displayed before a movement to the detailed screen is made.

In the above, it is assumed that the head of the user is moved upwardly and downwardly. However, the present disclosure is not limited to the above but it may be controlled such that the reproduction and stop of the moving image is also repeated according to the side to side movement of the head of the user.

Figure 10:
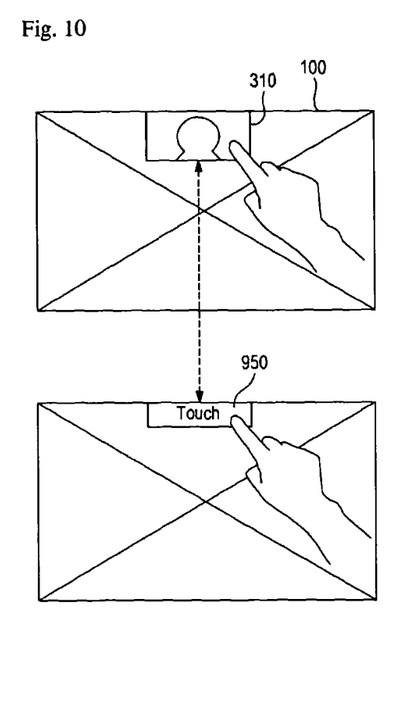
FIG. 10 is a view illustrating a process of controlling a detailed screen when a screen controlling method according to some embodiments is applied.

FIG. 10 is a view illustrating a process of controlling a detailed screen when a screen controlling method according to some embodiments is applied.

The image 310 obtained by photographing the user through the camera module may be displayed even in a state where a movement to the detailed screen is made as described above with reference to FIGS. 8 and 9. However, the user may desire that screen control is not performed through head tracking on the detailed screen. In addition, since the detailed screen is a reproduced screen for content, the user may not desire that a camera screen or the like overlaps the reproduced screen.

Therefore, when the user contacts the image 310 obtained by photographing the user by the camera module 110 by a finger to generate a touch input, the screen controlling apparatus 100 controls the image 310 obtained by photographing the user not to be displayed any further. In this case, the screen controlling apparatus 100 may control the camera module 110 to hold the photographing of the user and the head tracking.

However, when the user desires again to control the detailed screen by the movement of the head, the image 310 obtained by photographing the user through the camera module 110 must be displayed again. Thus, a camera screen output button 950 may be displayed. Therefore, when the user selects the camera screen output button 950, a photographed image is displayed again.

The above-described embodiments of the present disclosure can be implemented as computer readable codes in a computer readable medium. The computer readable recording medium may include but not limited to a program instruction, a local data file, a local data structure, or a combination thereof. The computer readable recording medium may be specific to various embodiments of the present disclosure or commonly known to those of ordinary skill in computer software. The computer readable recording medium includes all types of recordable media in which computer readable data are stored. Examples of the computer readable recording medium include a magnetic medium, such as a hard disk, a floppy disk and a magnetic tape, an optical medium, such as a CD-ROM and a DVD, a magneto-optical medium, such as a floptical disk, and a hardware memory, such as a ROM, a RAM and a flash memory, specifically configured to store and execute program instructions. Examples of the program instruction may include but not limited to machine code, which is generated by a compiler, and a high level language, which is executed by a computer using an interpreter and so on. The above-described hardware apparatus may be configured to operate as one or more software modules for performing the operation of the present disclosure, and the reverse case is similar.

While certain embodiments of the present disclosure have been described, these embodiments have been presented by way of example only, and are not intended to limit the scope of the disclosures. Indeed, the novel methods and apparatuses described herein may be embodied in a variety of other forms; furthermore, various changes, modifications, corrections, and substitutions with regard to the embodiments described herein may be made without departing from the spirit of the disclosures.

Therefore, the accompanying claims and their equivalents including the foregoing modifications are intended to cover the scope and spirit of the disclosures, and are not limited by the present disclosures.

The invention claimed is:

1. A method comprising
receiving a request to display content;
displaying a plurality of content regions on a screen;
tracking a head of a user viewing the screen via a camera module;
determining that the head of the user moves in a specific direction in a state where first content is displayed in a central content region among the plurality of content regions;
displaying, in the central content region, second content that was displayed in a peripheral content region; and
displaying a camera screen captured by the camera module on a part of the screen.

2. The method of claim 1, further comprising changing the camera screen to a predetermined screen control button when a touch input is generated on the camera screen.

3. The method of claim 2, further comprising highlighting the displayed central content.

4. The method of claim 3, wherein the first content and the second content includes at least one of a photo, image, moving image, document, and audio content.

5. The method of claim 3, further comprising making a movement to a detailed screen for specific content if the specific content is continuously displayed in the central content region for a predetermined time without detecting movement of the head of the user.

6. The method of claim 5, further comprising displaying an image indicator indicating whether there is previous or next content upon detection that the head of the user moves in a specific direction.

7. The method of claim 5, further comprising:
allowing the detailed screen to be enlarged upon detecting that the head of the user approaches the camera module; and
allowing the detailed screen to be reduced upon detecting that the head of the user is remote from the camera module.

8. The method of claim 7, further comprising:
allowing the detailed screen to be scrolled in a specific direction upon detecting that the head of the user moves in the specific direction; and
allowing the detailed screen to be scrolled in an opposite direction upon detecting that the head of the user moves in a direction opposite to the specific direction.

9. The method of claim 5, further comprising reproducing a moving image upon detecting that the specific content is a moving image and it is detected that the head of the user moves in a first direction.

10. The method of claim 9, further comprising stopping the reproduction of the moving image upon detecting that the head of the user moves in the first direction while the moving image is reproduced.

11. The method of claim 10, further comprising, making a movement to a screen on which the plurality of content regions are displayed upon detecting that the head of the user moves in a second direction in a state where reproduction of the moving image is stopped.

12. The method of claim 5, further comprising:
displaying a camera screen captured by the camera module on a part of the screen; and
changing the camera screen to a predetermined screen control button when a touch input is generated on the camera screen.

13. An apparatus comprising:
a screen;
a camera module;
head tracking unit for tracking a head of a user viewing a screen through the camera module; and
a screen control unit for displaying a plurality of content regions on the screen when a display request of content is received, and displaying, in a central content region, information on second content that was displayed in a peripheral content region when it is determined that the head of the user moves in a specific direction in a state where information on a first content is displayed in the central content region among the plurality of content regions, the peripheral content region being positioned in the specific direction or in a direction opposite to the specific direction from the central content region, wherein the screen control unit further displays a camera screen captured by the camera module on a part of the screen, and changes the camera screen to a predetermined screen control button when a touch input is generated on the camera screen.

14. The apparatus of claim 13, wherein the screen control unit displays the plurality of content regions on the screen in a grid arrangement.

15. The apparatus of claim 14, wherein the screen control unit displays the plurality of content regions on the screen so that they are shown to the user to be arranged in the form of a three-dimensional sphere.

16. The apparatus of claim 13, wherein the screen control unit controls the screen so that the central content region is positioned in the center part of the screen.

17. The apparatus of claim 13, wherein the screen control unit presents Information about whether the head tracking is successfully performed for the user.

18. The apparatus of claim 17, wherein the screen control unit presents the information about whether the head tracking is successfully performed by changing a color of a region of the screen.

19. The apparatus of claim 13, wherein the screen control unit additionally displays a predetermined screen control button, and wherein the screen control unit displays, in the central content region, the information on the second content which was displayed in a peripheral content region when it is determined that the head of the user moves in a specific direction in a state where the predetermined screen control button is selected.

20. The apparatus of claim 13, wherein the screen control unit additionally displays a predetermined screen control button, wherein if the predetermined screen control button is selected by continuously pressing the button for a predetermined time t1, the screen control unit holds the displaying of the information on the second content in the central content region until the predetermined screen control button is selected again by continuously pressing the button for a predetermined time t2.

* * * * *